US012698813B2

(12) United States Patent
Owens

(10) Patent No.: US 12,698,813 B2
(45) Date of Patent: Aug. 4, 2026

(54) SPRING KEEPERS AND SPRING ASSEMBLIES INCORPORATING THE SAME

(71) Applicant: Delta Scientific Corporation, Palmdale, CA (US)

(72) Inventor: Matthew Owens, Glendale, CA (US)

(73) Assignee: Delta Scientific Corporation, Palmdale, CA (US)

( * ) Notice: Subject to any disclaimer, the term of this patent is extended or adjusted under 35 U.S.C. 154(b) by 345 days.

(21) Appl. No.: 18/500,052

(22) Filed: Nov. 1, 2023

(65) Prior Publication Data

US 2025/0137509 A1     May 1, 2025

(51) Int. Cl.
*F16F 1/12* (2006.01)

(52) U.S. Cl.
CPC ................ *F16F 1/125* (2013.01); *F16F 1/12* (2013.01); *F16F 2230/007* (2013.01); *F16F 2230/10* (2013.01); *F16F 2236/045* (2013.01)

(58) Field of Classification Search
CPC .......... F16F 1/128; F16F 1/13; F16F 2230/10; F16F 1/12; F16F 1/125; F16F 2230/007; F16F 2236/045
USPC ........................................ 267/150, 169, 170
See application file for complete search history.

(56) References Cited

U.S. PATENT DOCUMENTS

| 1,546,164 | A | * | 7/1925 | Bluhm | ................... | B60G 13/02 |
| | | | | | | 267/286 |
| 2,579,641 | A | * | 12/1951 | Aldrich | ................ | B21D 45/006 |
| | | | | | | 83/140 |
| 2,754,112 | A | * | 7/1956 | Pouell | .................. | B60G 17/021 |
| | | | | | | 267/286 |
| 2,842,355 | A | * | 7/1958 | Lang | ........................ | F16H 55/56 |
| | | | | | | 474/46 |
| 4,457,196 | A | * | 7/1984 | Cady | .................... | B21D 45/006 |
| | | | | | | 83/699.41 |
| 5,893,330 | A | * | 4/1999 | Emery | .................... | F16F 1/128 |
| | | | | | | 280/124.179 |
| 2017/0224894 | A1 | * | 8/2017 | Najar | .................. | A61M 60/894 |

FOREIGN PATENT DOCUMENTS

| ES | 2233722 | T3 | * | 6/2005 | ............. | F16F 1/128 |
| FR | 2607172 | A | * | 5/1988 | | |

* cited by examiner

*Primary Examiner* — Devon C Kramer
(74) *Attorney, Agent, or Firm* — Womble Bond Dickinson (US) LLP

(57) ABSTRACT

A spring keeper for maintaining a high energy spring includes an outer barrel, an inner barrel slideable within the outer barrel, a first centerer fitted inside the inner barrel, the first centerer including a first base and a first projection projecting axially from the first base for being received within a first end portion of a spring, and a second centerer fitted inside the outer barrel, the second centerer including a second base and a second projection projecting axially from the second base for being received within a second end portion of the spring.

16 Claims, 12 Drawing Sheets

SPRING KEEPERS AND SPRING ASSEMBLIES INCORPORATING THE SAME

BACKGROUND

Anti-terrorist barrier rams have very heavy barriers, such as gates or arms, which are raised and lowered to open and close access to facilities, as for example roads and entrances. The barriers are pivotally mounted to a frame. Traditionally, due to the weight of the barriers, large hydraulic cylinders or actuators are used to provide sufficient torque to raise and lower them. These actuators take up space making it more difficult to incorporate such actuators in barrier ram frames that are shallow that allow them to be shallow mounted, i.e., mounted in shallow depths from the surface. To allow for use of smaller actuators, high energy springs are utilized to assist the actuators in opening and closing the barrier. If these high energy springs fail, they can cause severe damage to the barrier ram and to objects and persons close to the barrier ram. As such, spring systems are required that will safeguard against spring failure.

SUMMARY

In an example embodiment, a spring keeper for maintaining a high energy spring includes an outer barrel, an inner barrel slideable within the outer barrel, a first centerer fitted inside the inner barrel, the first centerer including a first base and a first projection projecting axially from the first base for being received within a first end portion of a spring, and a second centerer fitted inside the outer barrel, the second centerer including a second base and a second projection projecting axially from the second base for being received within a second end portion of the spring. In another example embodiment, the spring keeper also includes a first shim for adjusting a preload of the spring, the first shim being fitted in the inner barrel and sandwiched between the first centerer and the inner barrel. In yet another example embodiment, the spring keeper further includes a second shim for adjusting the preload of the spring, the second shim being fitted in the outer barrel and sandwiched between the second centerer and the outer barrel. In a further example embodiment, the spring keeper also includes a layer of a wear resistant material covering the outer surface of the inner barrel that is received within the outer barrel. In yet a further example embodiment the spring keeper also includes another layer of wear resistant material covering an inner surface of the inner barrel. In one example embodiment, the layer and the another layer of wear resistant material extend beyond the inner barrel and are connected to each other at a location beyond the inner barrel. In another example embodiment, the wear resistant material comprises at least one of ultra-high molecular weight polyethylene (UMHW), Delrin or polytetrafluoroethylene (PTFE). In yet another example embodiment, each of said inner barrel and outer barrel is made from a material comprising at least one of steel, aluminum and titanium.

In one example embodiment, a spring assembly includes a high energy spring and a spring keeper. The spring keeper includes an outer barrel, an inner barrel slideable within the outer barrel, a first centerer fitted inside the inner barrel, the first centerer including a first base and a first projection projecting axially from the first base and received within a first end portion of the spring, and a second centerer fitted inside the outer barrel, the second centerer including a second base and a second projection projecting axially from the second base and received within a second end portion of the spring. In another example embodiment, the spring keeper assembly also includes a first shim for adjusting a preload of the spring, the first shim being fitted in the inner barrel and sandwiched between the first centerer and the inner barrel. In yet another example embodiment, the spring keeper assembly further includes a second shim for adjusting the preload of the spring, the second shim being fitted in the outer barrel and sandwiched between the second centerer and the outer barrel. In a further example embodiment, the spring keeper assembly also includes a layer of a wear resistant material covering the outer surface of the inner barrel that is received within the outer barrel. In yet a further example embodiment the spring keeper assembly also includes another layer of wear resistant material covering an inner surface of the inner barrel. In one example embodiment, the layer and the another layer of wear resistant material extend beyond the inner barrel and are connected to each other at a location beyond the inner barrel. In another example embodiment, the wear resistant material comprises at least one of ultra-high molecular weight polyethylene (UMHW), Delrin or polytetrafluoroethylene (PTFE). In yet another example embodiment, each of said inner barrel and outer barrel of the spring keeper assembly is made from a material comprising at least one of steel, aluminum and titanium.

DETAILED DESCRIPTION

Figure 1:
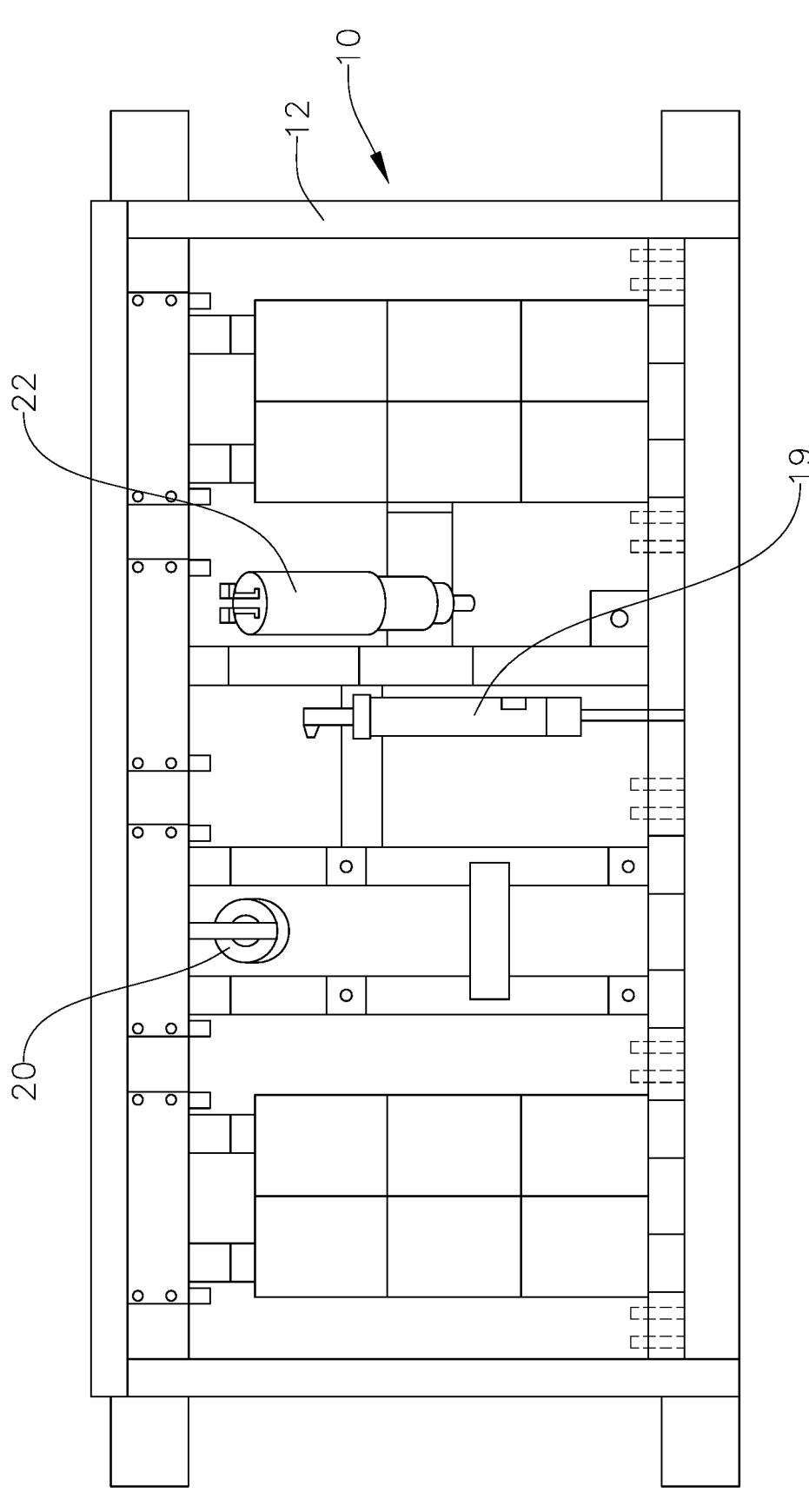
FIG. 1 is a top view of an example embodiment barrier ram.

In an example embodiment, a barrier ram includes a balancing system which includes springs that counteract the effects of gravity on the barrier ram. Barrier rams 10 as for example shown in FIGS. 1, 2A, 2B, 2C, 3A, 3B, and 3C include a frame 12 and one or more moveable barriers 14 such as a gate, arms, etc., that pivot about a pivot axis 16 of a pivot 18 to open and close relative to the frame. In an example embodiment, two compression springs are used. One or more actuators 19 are pivotably connected to the frame and the barrier and are used to provide a requisite torque to open and close the barrier. The two compression springs, include a first spring 20 and a second spring 22, and are positioned and oriented, as for example shown in FIG. 1, such that each spring has a desirable torque curve. One of the two springs is positioned closer to one side of the frame and the other closer to the other side of the frame. For illustrative purposes, when the barrier is down is a closed position, that position will also be sometimes referred to as a "road open position" as the barrier will not block the road or other facilities. Similarly, when the barrier is in an extended open position, that position will also sometimes be referred to as to "road closed position" since the barrier will be in a position blocking the passage to the road or other facilities. It should be understood that torque as used herein with the reference to the barrier refers to torque about the pivot axis 16 of the barrier. The two springs provide for torque in a first direction about the pivot axis, while gravity, due to the weight of the barrier, provides for torque about the pivot axis in a second direction opposite the first direction.

Figures 2A, 2B:
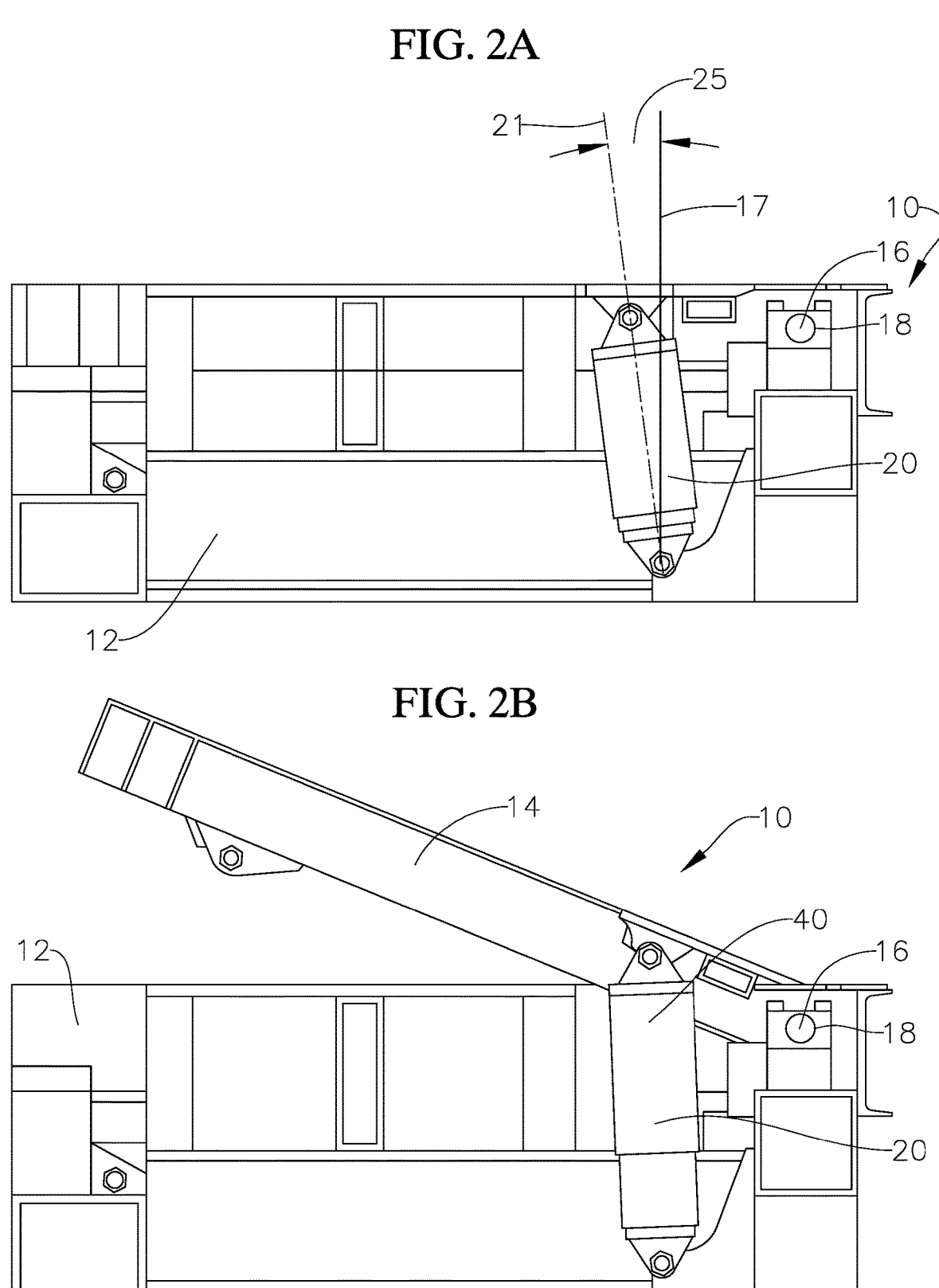
FIGS. 2A, 2B, and 2C are cut away side views of the example embodiment barrier ram shown in FIG. 1 depicting a first spring when a barrier is in a closed position, a position between the closed and an open positions, and closed position, respectively.
Figure 2C:
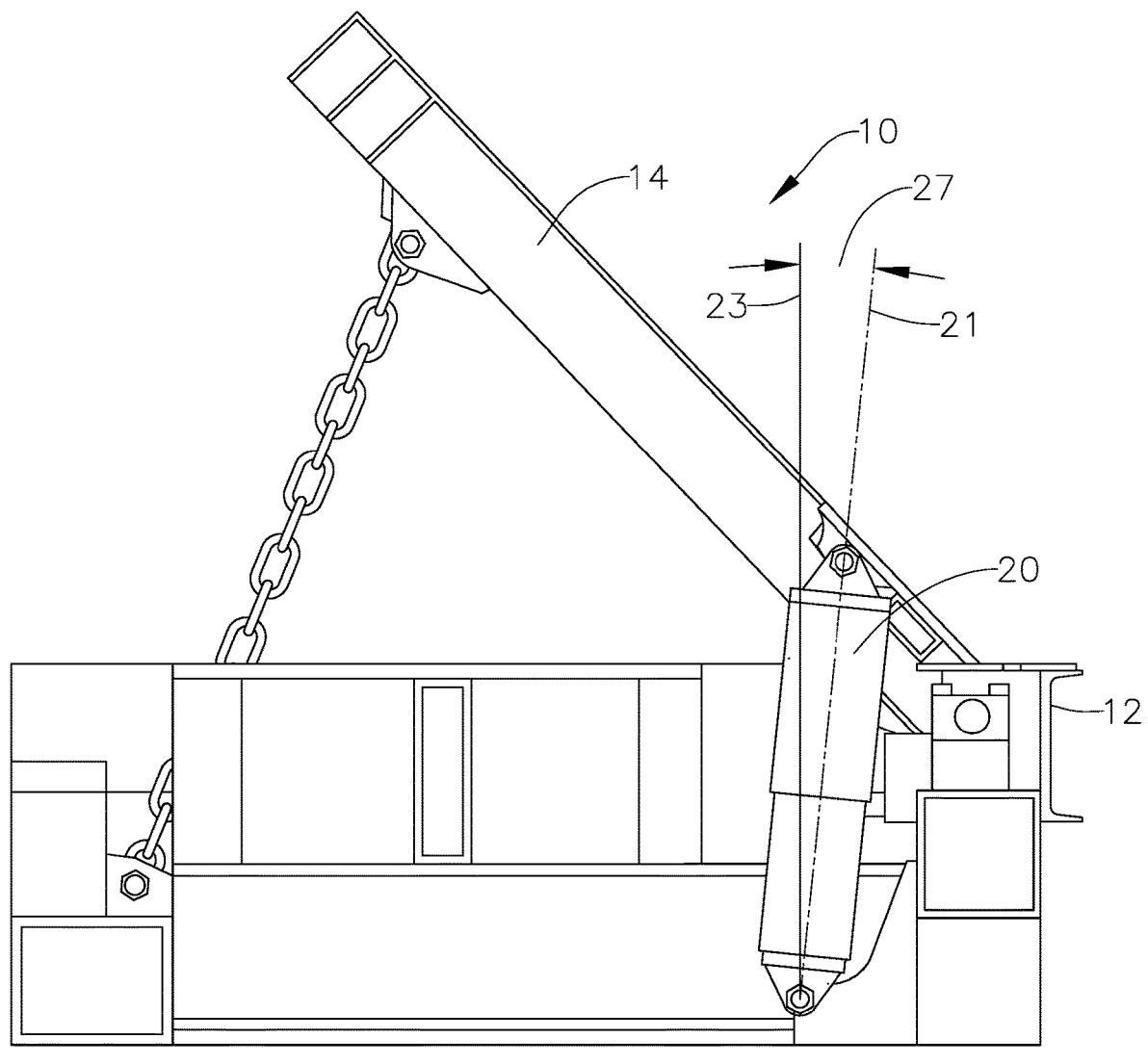

The first spring 20 is rotatably mounted to the frame and to the barrier such that is in a first position when the barrier is in the closed position, as for example shown in FIG. 2A. While in this position with the frame mounted horizontally, the axis of extension and compression of the first spring (the "first spring axis" 21), in an example embodiment, is in a first orientation within an angle 25 of 25 degrees of a vertical axis 17. The first spring is fully compressed, or almost fully compressed, when at this orientation. As the barrier moves from the closed position to the open position, the first spring rotates relative to the frame from the first orientation through a vertical position and past the vertical position to a second orientation when the barrier is in the second position as shown in FIGS. 2A, 2B and 2C. In an example embodiment, when in the second orientation, the first spring axis 21 is within an angle 27 of 25 degrees from the vertical axis 17. In an example embodiment, when at the second orientation, the first spring is fully extended or near fully extended. In the shown example embodiment, the first spring is almost fully extended.

Figure 4:
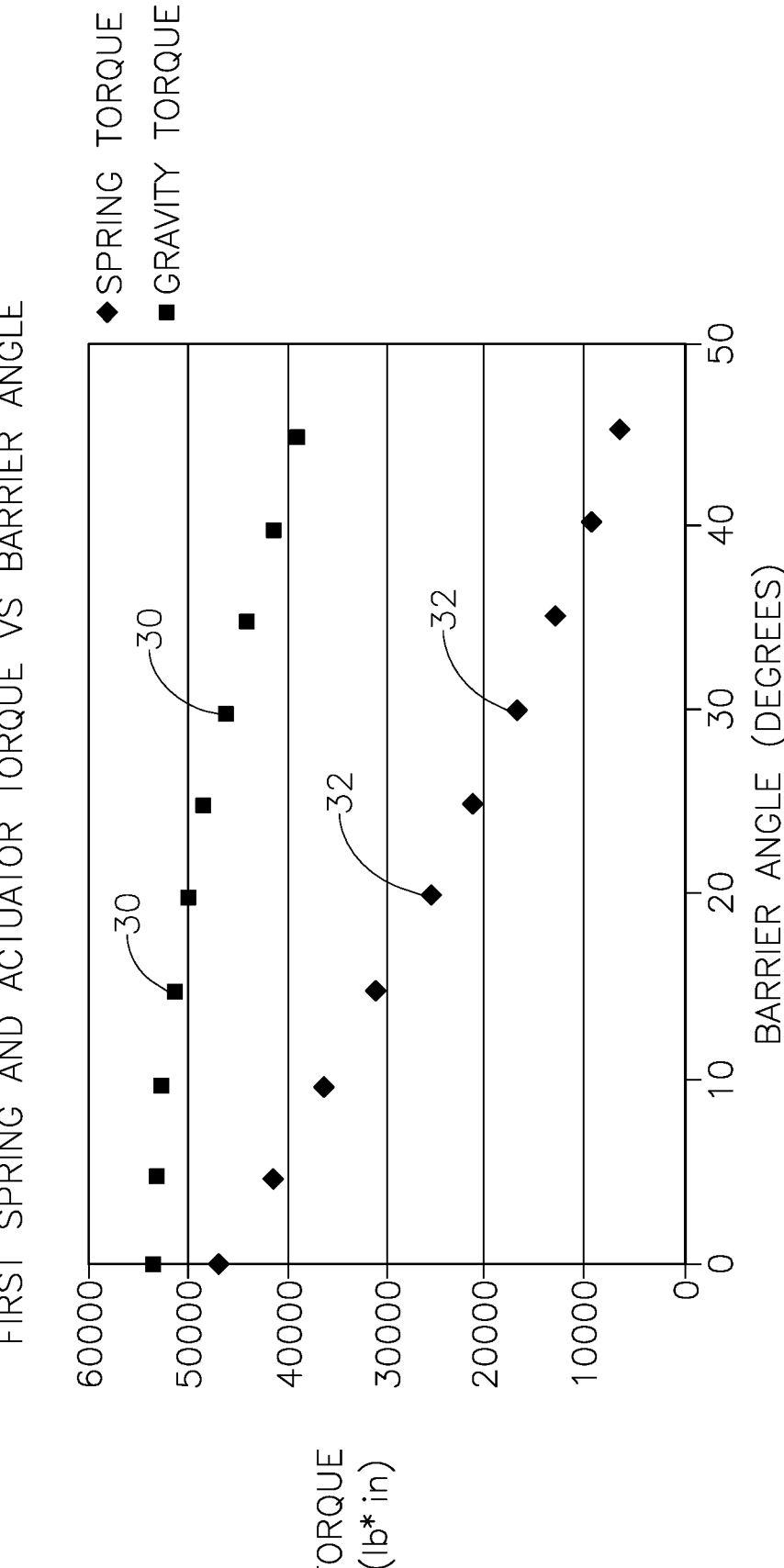
FIG. 4 is a chart depicting torque applied by the first spring to the barrier of the example embodiment barrier ram and torque due to gravity acting on the barrier at different barrier angles.

FIG. 4 is a chart of the torque on the barrier about the pivot axis due to gravity (noted by squares 30 defining a first spring torque curve) and applied by the first spring (noted by diamonds 32 defining a gravity torque curve) as measured at different barrier open angles relative to the frame. The torque provided by the first spring is in the opposite direction from the torque provided on the barrier due to gravity. When at 0 degrees, the barrier is in the closed position. As can be seen to FIG. 4, when the barrier is in the closed position (i.e., at 0 degrees), the torque provided by the first spring is close to the torque due to gravity. The difference between the torque provided by the first spring and the torque due to gravity is greater or greatest when the barrier is in the open position.

Figure 3A:
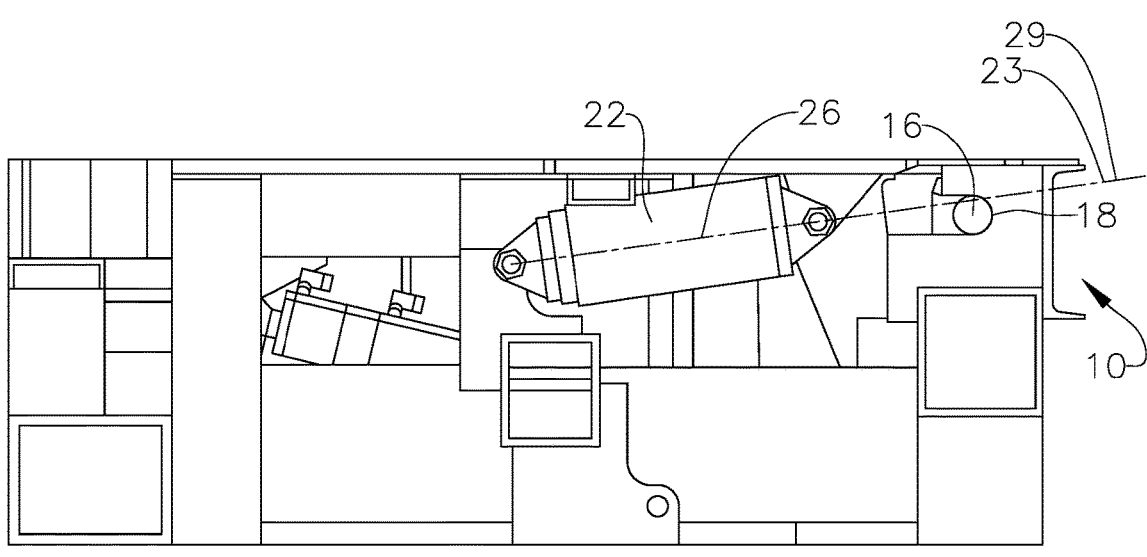
FIGS. 3A, 3B, and 3C are cut away side views of the example embodiment barrier ram shown in FIG. 1 depicting a second spring when a barrier is in a closed position, a position between the closed and an open positions, and closed position, respectively.
Figure 3B:
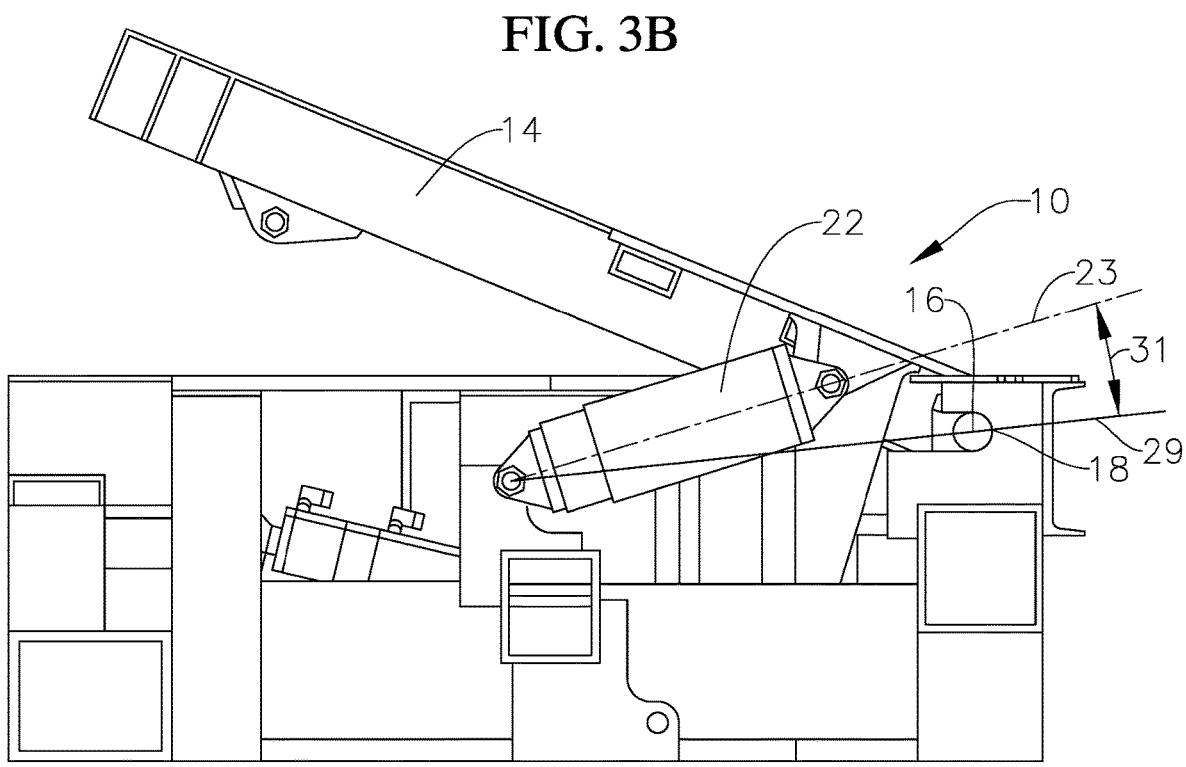

The second spring 22 is rotatably mounted to the frame and to the barrier with its spring axis, i.e., its axis of extension and compression (the "second spring axis") 23 oriented at a first orientation so as to intersect the pivot axis, or pass very close or adjacent to the pivot axis 16, when the barrier is in the closed position, as for example shown in FIG. 3A. For reference, when the second spring axis is intersects the pivot axis, the second pivot axis is at the intersecting orientation 29, as for example shown in FIG. 3A. When the barrier is in the closed position, the second spring axis 23 is at a first orientation which is coaxial with the intersecting axis 29 or offset from the intersecting axis by an offset angle 31. In the example embodiment shown in FIG. 3A, the second spring axis 23 is coaxial with the intersecting axis 29. In an example embodiment, when in the first orientation, the offset angle is no greater than 30 degrees. In a further example embodiment, the offset angle is no greater than 25 degrees. In another example embodiment, the offset angle is no greater than 20 degrees. In another example embodiment, the offset angle is no greater that 15 degrees. In yet another example embodiment, the offset angle is no greater than 10 degrees. In a further example embodiment, the offset angle is no greater than 5 degrees. As the barrier is opening relative to the frame, the offset angle 31 increases. When the barrier is in the open position, the second spring axis is at a second orientation offset by the angle 31 from the intersecting axis, which is greater than the offset angle 31 when in the first orientation.

Figure 5:
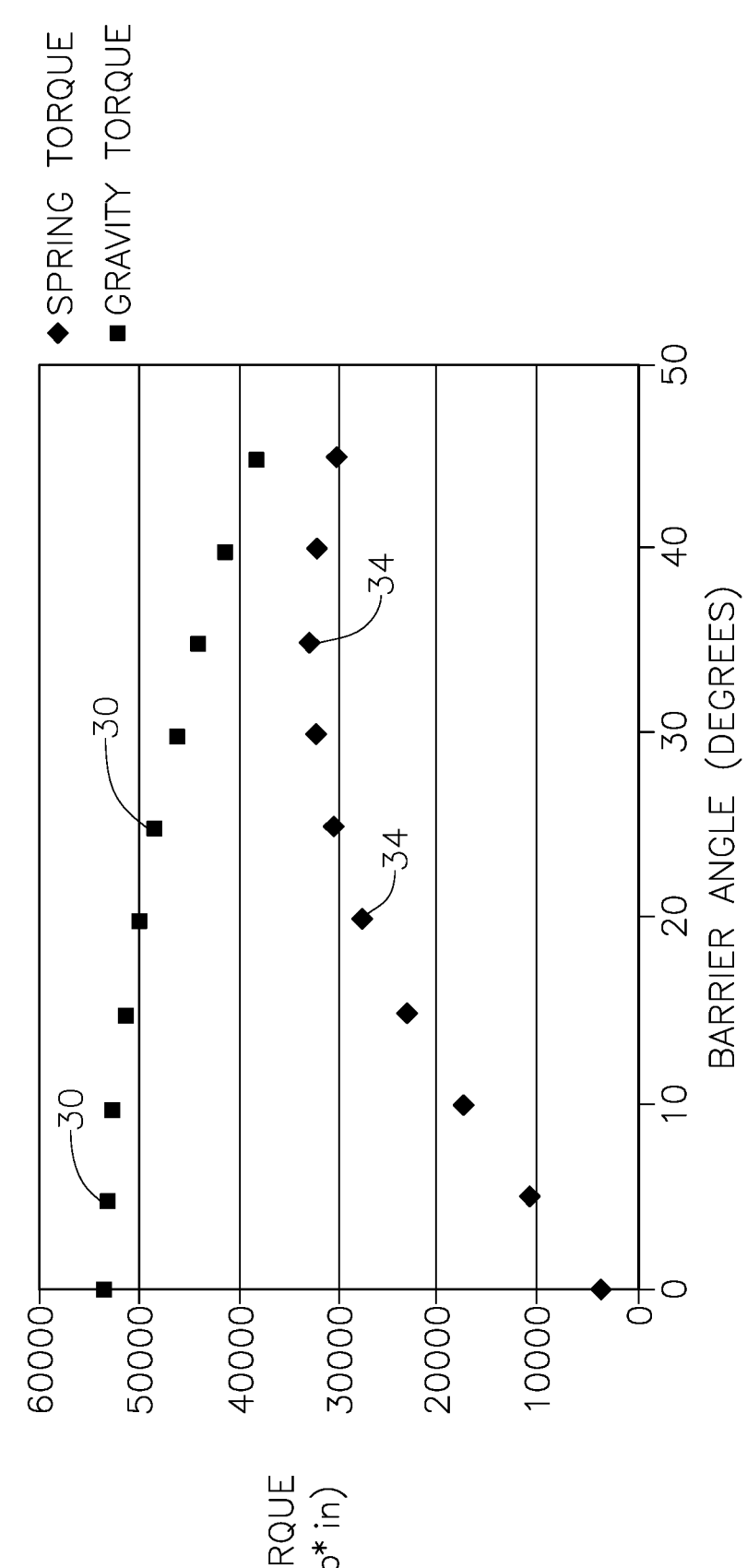
FIG. 5 is a chart depicting torque applied by a second spring to the barrier of the example embodiment barrier ram and torque due to gravity acting on the barrier at different barrier angles.

When in the closed position (at 0 degrees) as shown in FIG. 3A, the second spring is in a compressed, or fully compressed, position. When the barrier in the open position the second spring is less compressed and more extended, as shown for example in FIG. 3C. FIG. 5 is a chart depicting the torque applied to the barrier about the pivot axis by the second spring (denoted by diamonds 34 defining a second spring torque curve) and the torque due to gravity (denoted by squares 30 defining the gravity torque curve) about the pivot axis as measured when the barrier is oriented at different angles relative to the frame. As can be seen from FIG. 5 when the barrier is in the open position, the torque provided by the second spring is close to the torque due to gravity. The difference between the torque provided by the second spring and the torque due to gravity is greater, or greatest, when the barrier is in the closed position (i.e., at 0 degrees). The torque provided by the second spring is the lowest when the second spring is compressed, or fully compressed, when the barrier is in the closed position. As the barrier is opened from the closed position, the second spring axis rotates further away from the pivot axis, i.e., the angle 31 increases. As such, the torque provided by the second spring increases and then decreases as the second spring approaches full extension.

To summarize, the first spring 20 reaches near full extension, or full extension, when the barrier is raised into the open (or road closed) position, exerting no, or minimal, torque on the barrier about the pivot, as for example shown in FIG. 2C. When the barrier 14 is in the fully down position, as for example shown in FIG. 3A, the second spring 22 is fully compressed, or almost fully compressed, with its second spring axis 26 oriented to intersect the pivot axis 16 of the barrier or pass very close to the pivot axis and thus, applies nearly no torque to the barrier about pivot axis despite the first spring being compressed or fully compressed. As the barrier is raised, the effective lever arm of the

Figure 3C:
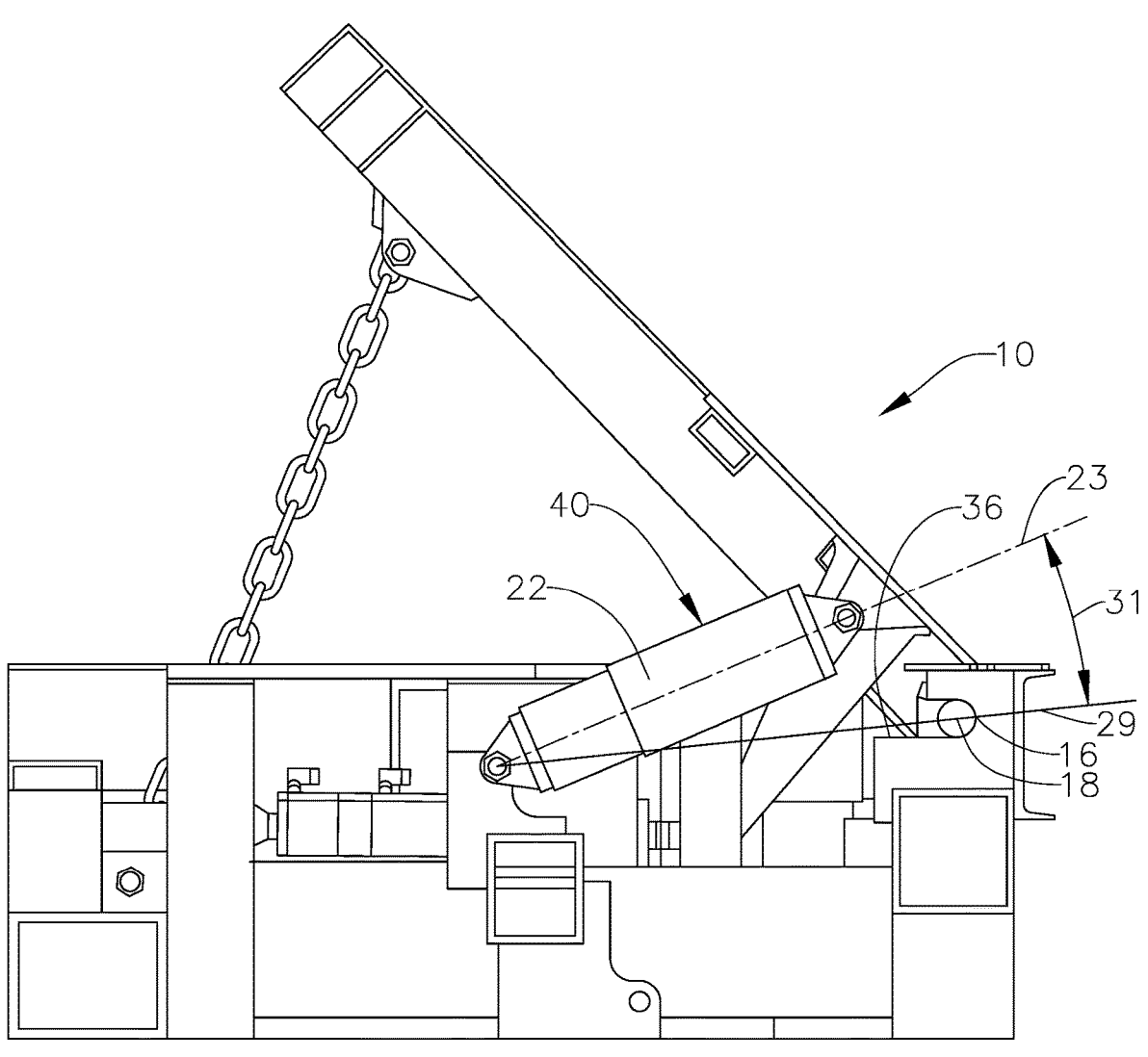

5 second spring grows, as the second spring axis rotates further away from the pivot axis. In an example embodiment, as shown in FIG. 3C, when the barrier is in the fully up position (road closed position) the second spring is still compressed (though not at full compression).

Figure 6:
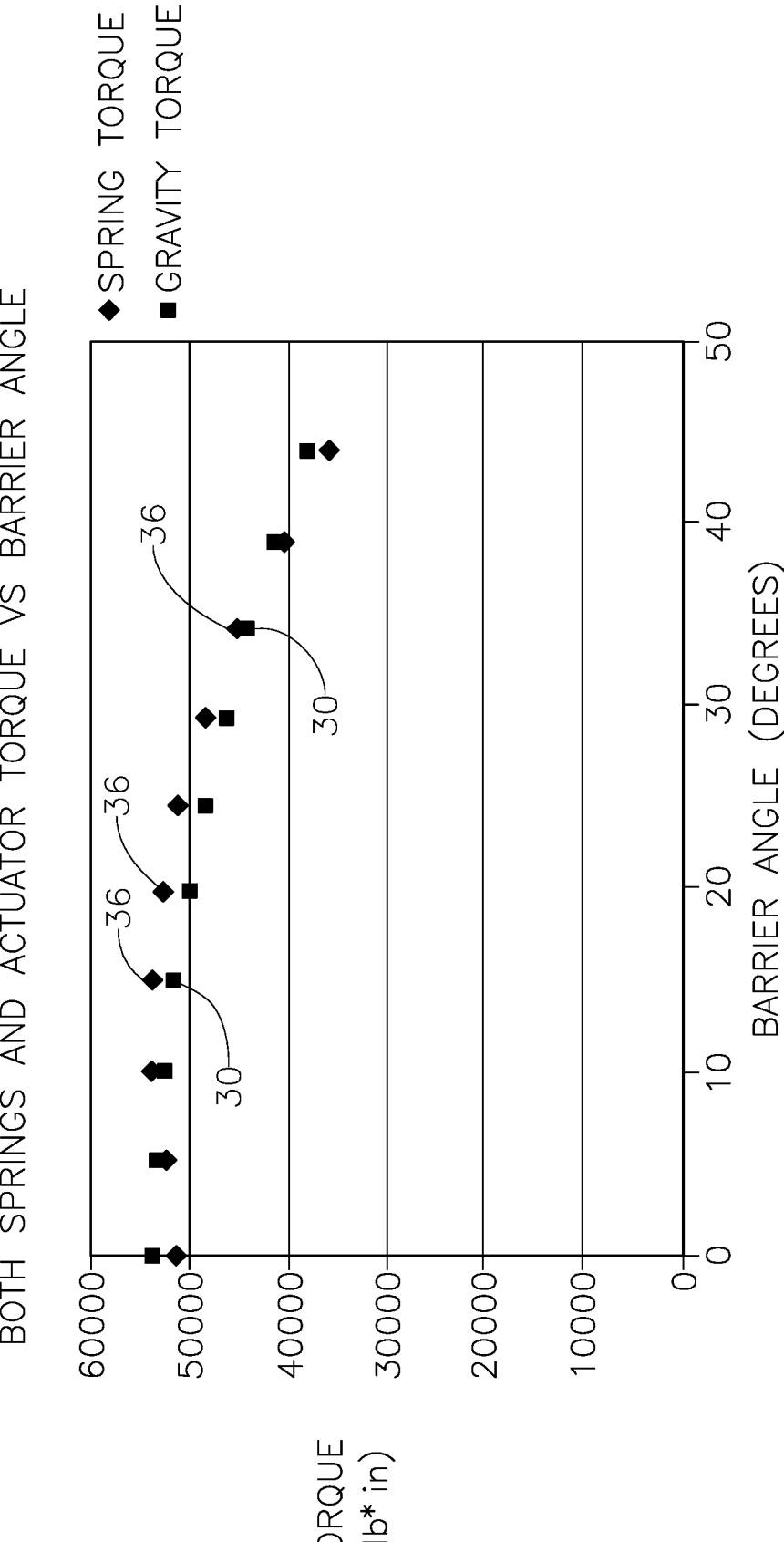
FIG. 6 is a chart depicting the combined torque applied by the first spring and the second spring to the barrier of the example embodiment barrier ram and torque due to gravity acting on the barrier at different barrier angles.

The first and second springs are selected such that their combined torque (the "combined spring torque") 36 defines a combined torque curve about the pivot axis that matches or is very close to the torque curve due to gravity as the barrier rotates between its open and closed positions, as for example shown in FIG. 6. As stated before, the torque created by the springs is opposite the torque due to gravity (the "gravity torque"). In an example embodiment, the difference in torque between the combined spring torque 36 and the gravity torque at any angle between and including the barrier closed and open positions is not greater than 25% of either the combined spring torque or the gravity torque. In a further example embodiment, this difference in torque is not greater than 20% of either the combined spring torque or the gravity torque. In yet a further example embodiment, this difference in torque is not greater than 15% of either the combined spring torque or the gravity torque. In another example embodiment, this difference in torque is not greater than 10% of either the combined spring torque or the gravity torque. In yet a further example embodiment, this difference in torque is no greater than 5% of either the combined spring torque or the gravity torque. In any of the aforementioned example embodiments, the difference in torque is the stated percentage of the smaller of the combined spring torque and the gravity torque. In other words, at any angle between the open and closed position, the torque required to be provided by at least one actuator 19 to open the barrier, will be not greater than a percentage of the combined spring torque or the gravity torque, or a percentage of the smaller of the combined spring torques or the gravity torque. In one example embodiment, this percentage is not greater than 25%. In another example embodiment, this percentage is not greater than 20%. In yet another example embodiment, this percentage is not greater than 15%. In a further example embodiment, this percentage is not greater than 10%. In yet a further example embodiment, this percentage is not greater than 5%. In one embodiment, at each angle, the springs offset at least 75% of the torque due to gravity. In another embodiment, the offset is at least 80% of the torque due to gravity. In yet another example embodiment, the offset is at least 85%. In a further example embodiment, the offset is at least 90%. In yet another example embodiment, the offset is at least 95%. As a result, the frames may be made shallower as the barrier may be operated using smaller actuators, due to the smaller required torque to open the barrier, which take up less space.

Figure 7:
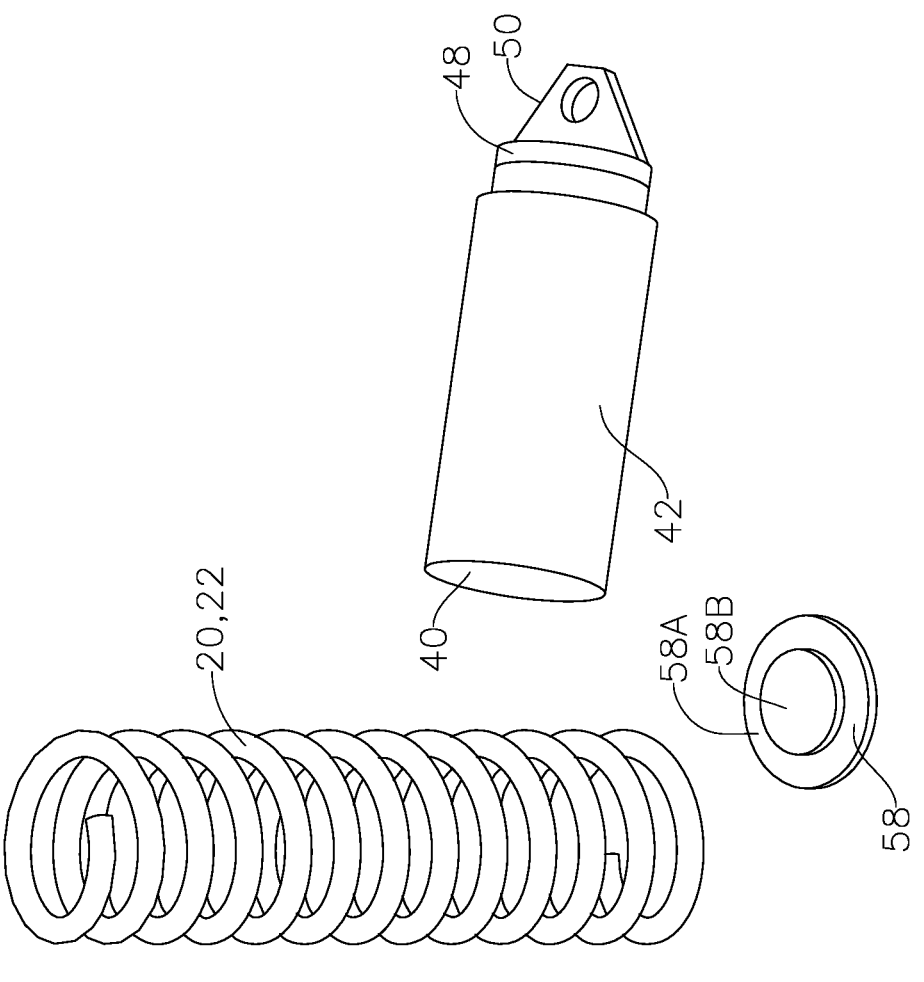
FIG. 7 is an exploded view of an example embodiment spring including a spring keeper and spring centerers incorporated in the example embodiment barrier ram.
Figure 7:
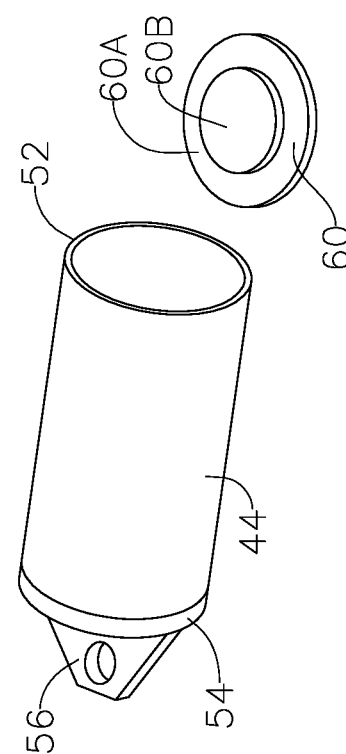

At full compression, the springs store large amounts of energy. In an example embodiment they each have a rate greater than 350 lb/in, and in a further example embodiment they each have a rate in the range of 350 lb/in to 750 lb/in. In one example embodiment, the springs have a rate greater than 500 lb/in. In another example embodiment each spring had a free length of 24 inches and has an inner diameter of about a 3.75. The diameter of the wire forming the spring is in the range of about 0.75 to about 1 inch. Thus, the outer diameter is in the range of about 5.25 to about 5.75 inches. In addition, due to geometry constraints inside a barrier ram, the springs are at risk of buckling due to their length to diameter ratio. To prevent the springs from buckling, in an example embodiment, each spring is housed in a keeper 40, as for example shown in FIGS. 7 and 8. Buckling would inhibit the spring's ability to properly balance the barrier. The keepers provide the springs with side support preventing them from bucking. The keepers also serve to store the high energy of the springs should the springs break or buckle. As a result, the keepers ensure optimum spring performance and operational life. In an example embodiment, each spring keeper 40 includes an inner barrel 42 and an outer barrel 44. The inner barrel has a first open end 46 for receiving a first end of a spring 20, 22. A second end 48 of the inner barrel is closed, or restricted, defining a base for retaining the first end of the spring within the barrel. A clevis or other means 50 extends from the second end of the first barrel for connecting to the frame or the barrier. The outer barrel 42 has a first open end 52 for receiving a second end of a spring 20, 22. A second end 54 of the outer barrel is closed, or restricted, for retaining a second end of the spring within the barrel. A clevis or other means 56 extends from the second end of the second barrel for connecting to the frame or the barrier. The inner barrel has an outer surface having a smaller diameter than the inner surface of the outer barrel. In this regard, the first end of the inner barrel can slide within the outer barrel past the first end of the outer barrel. In an example embodiment, each barrel is formed from a wear resistant material. In one example embodiment, each barrel is made from steel. In another example embodiment, each barrel is made from aluminum. In a further example embodiment, each barrel is made from titanium.

Prior to placing the spring in each of the barrels, a first centerer 58 is placed in the inner barrel and a second centerer 60 is placed in the outer barrel. Each centerer has a circular base 58A, 60A and a protrusion 58B, 60B protruding axially from the base portion. Each spring has an inner diameter and an outer diameter. Each protrusion has an outer diameter slightly smaller than the inner diameter of the spring so that it can be received within its corresponding spring end inner diameter. Each base has a diameter larger than the diameter of its corresponding protrusion and slightly smaller than the inner diameter of its corresponding barrel, such that when it is placed within the barrel it has minimal or no sideway play. The centerers serve to minimize the sideway play of each spring as it compresses and extends.

Figures 8, 10:
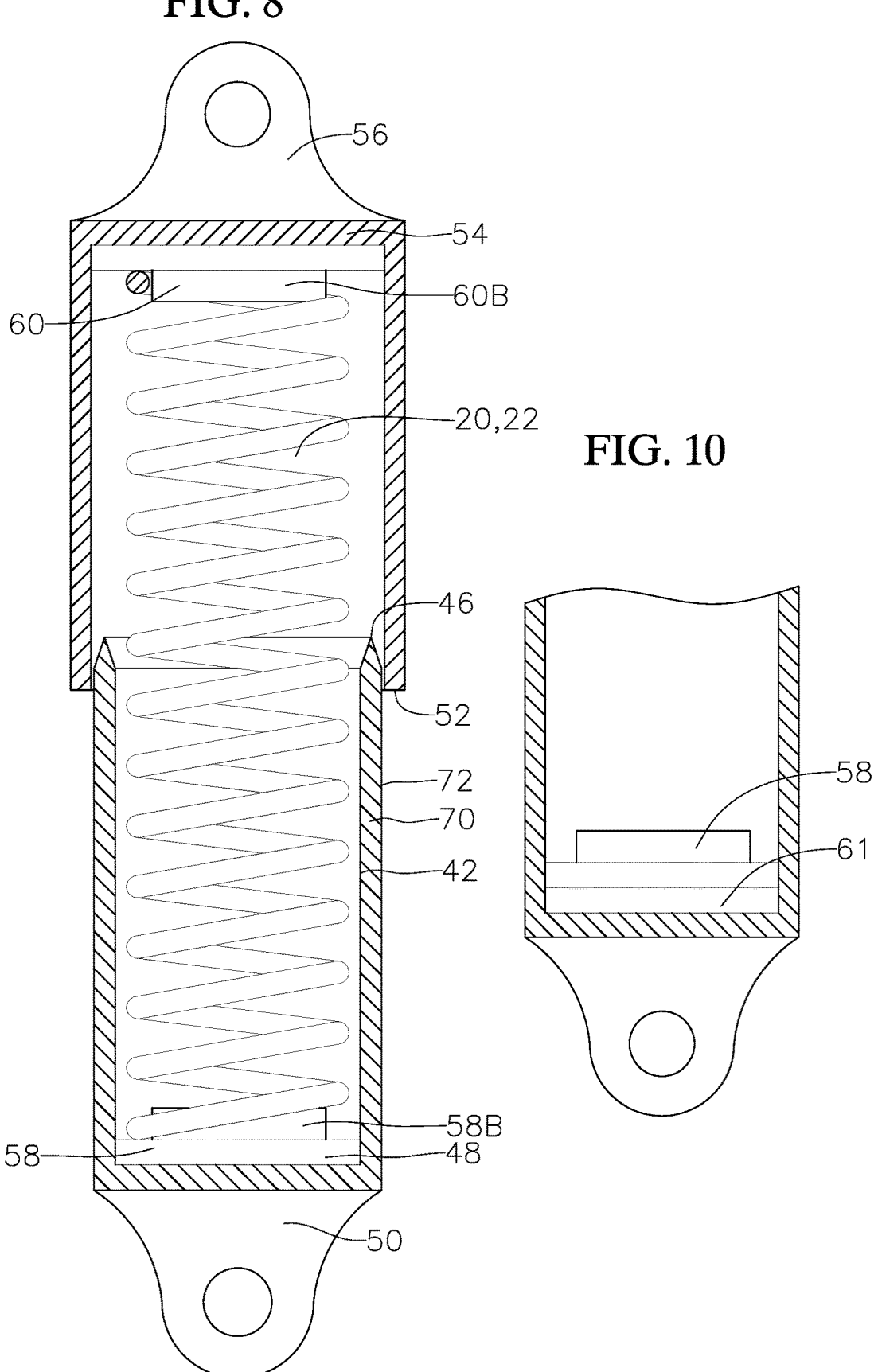
FIG. 8 is a cross-sectional view of an example embodiment spring housed in an example embodiment spring keeper.
FIG. 10 is a partial cross-sectional view of an inner barrel with a shim and centerer installed.
Figure 9:
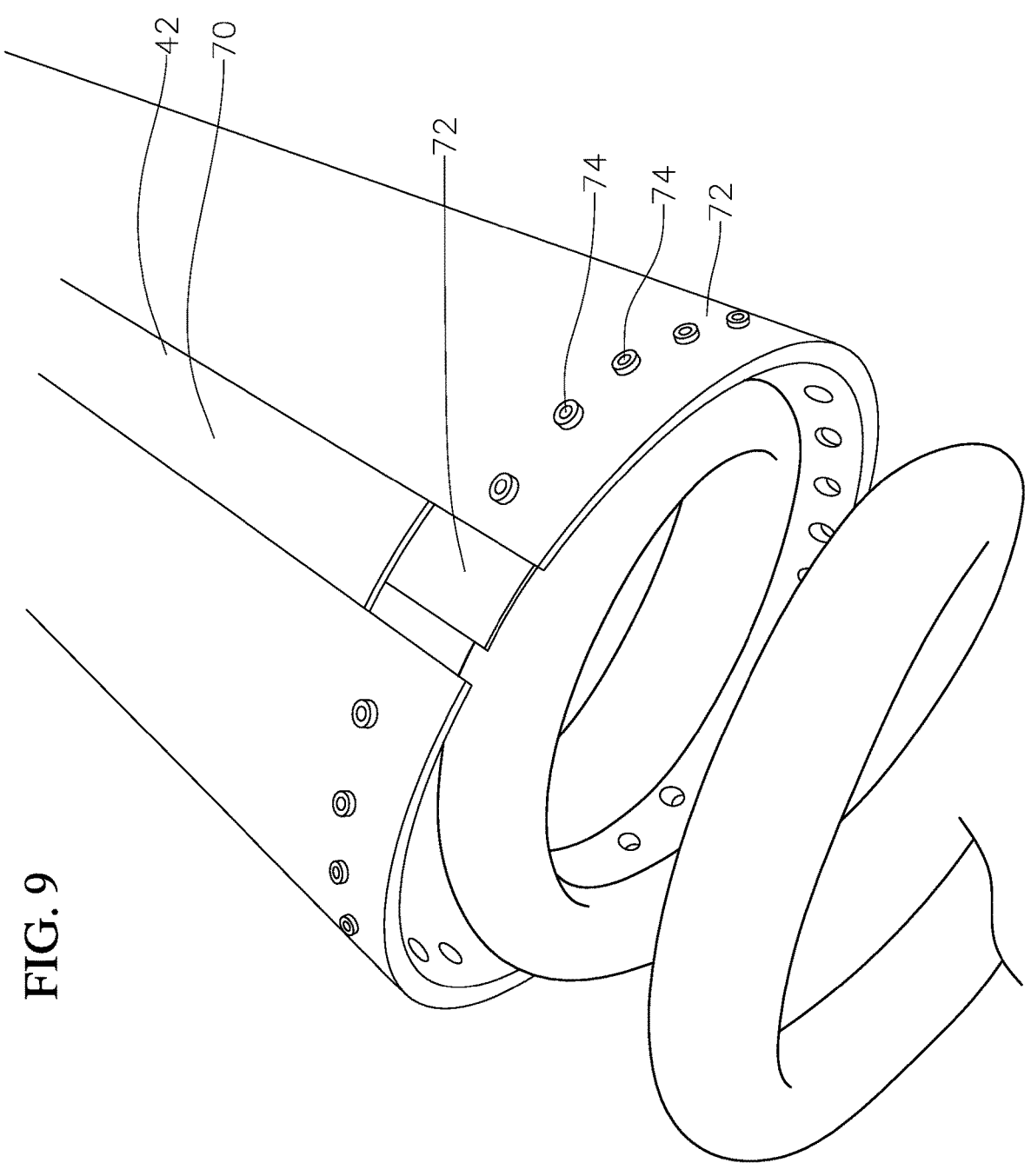
FIG. 9 is a partial perspective view of an example embodiment spring keeper inner barrel housing an example embodiment spring.

In an example embodiment, the outer surface 70 of the inner barrel is lined with a protective wear layer 72, as for example shown in FIGS. 8 and 9. In an example embodiment, the protective wear layer used is also one that fosters the sliding of the inner barrel within the outer barrel. In an example embodiment, the protective wear layer is a layer of ultra-high molecular weight polyethylene (UMHW). In another example embodiment, the protective wear layer may be a layer of Delrin or may be a polytetrafluoroethylene (PTFE) coating. In one example embodiment, as shown in FIGS. 8 and 9, the inner surface of the inner barrel is also lined with a protective wear layer. With this example embodiment, the two wear protective layers may extend from proximate the second end of the inner barrel to beyond the first end of the inner barrel, as for example shown in FIGS. 8 and 9. In an example embodiment, they two layers extend ¾ inch beyond the first end of the inner barrel and the portions of the two layers extending beyond the first end are connected to each other to prevent them from peeling away from each other. In one example embodiment, these portions are riveted to each other with rivets 74.

To form a spring housed in a spring keeper, the centerers are placed in the first and second barrels so that their bases 58A, 60A are over their corresponding barrel second ends and with their protrusions 58B, 60B, extending from their corresponding base in a direction toward their corresponding barrel's second end. The spring is inserted through the first end of each barrel and the inner barrel is slid within the outer barrel. Each protrusion 58B, 60B is received within a corresponding end of the spring. In one example barrels are sized such that when the spring is fully extended, a portion of the inner barrel is within the outer barrel. In another example embodiment, when compressed an entire spring can fit within its corresponding inner barrel.

The spring keepers also allow for the installation of one or more shims 61 to give the springs more preload, if necessary. This can help to adjust-in the spring torque curves as necessary. The shims 61 are simply round stocks of metal that slip inside the spring keepers prior to the installation of the centerers and the spring such that they are sandwiched between the centerer and the second end of the corresponding barrel, as for example shown in FIG. 10. The shims 61 may be installed one on both of the inner and outer barrels.

Figure 11:
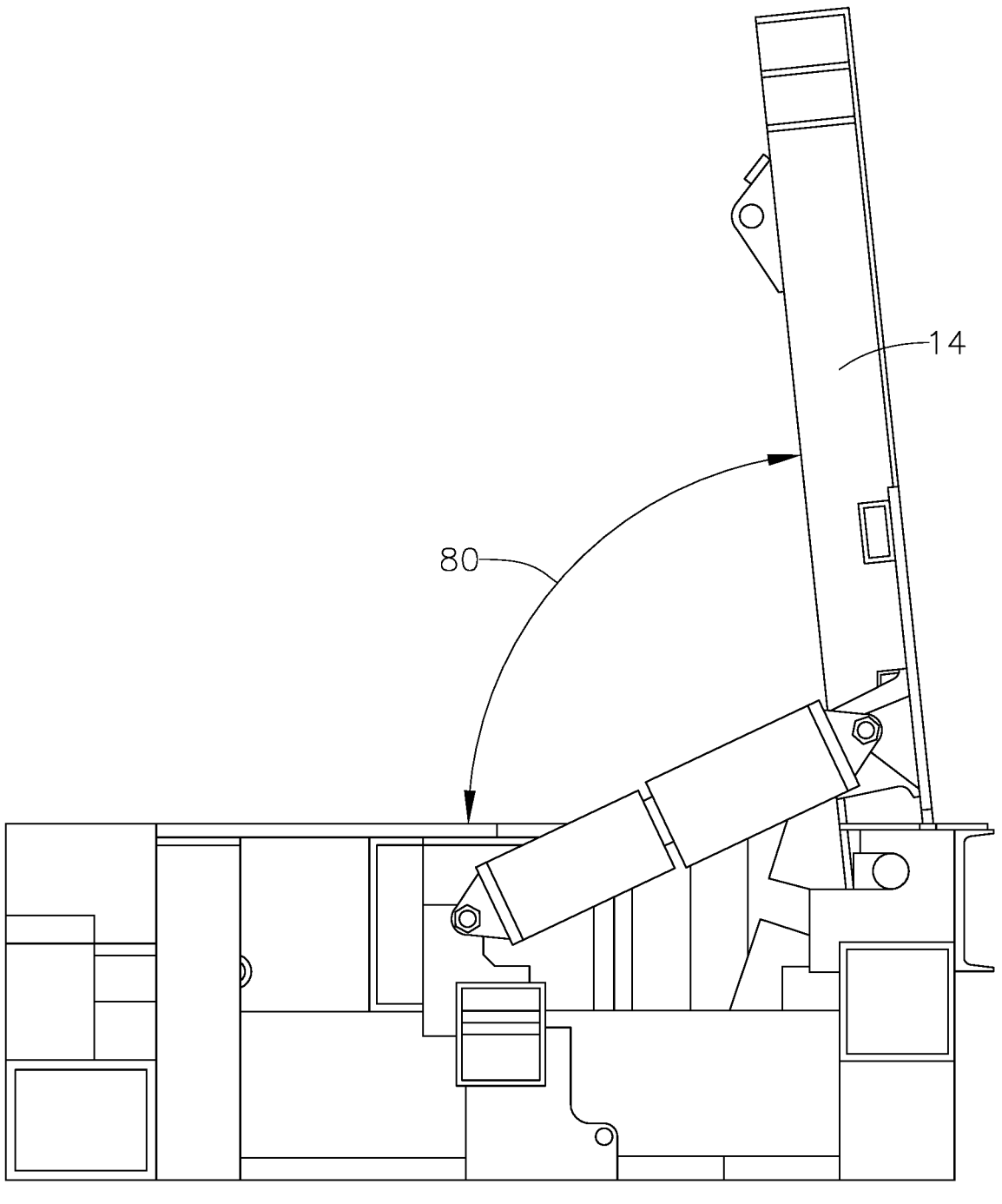
FIG. 11 is a cut away side view of the example embodiment barrier ram shown in FIG. 1 depicting a second spring when a barrier is in a 90-degree position for allowing the installation of the second spring at its free length.

Typical barriers aren't capable of rotating much past their open (road closed) position. But when in the open position, the second spring will still be highly compressed. As such, it would be very difficult and dangerous to install a second spring of its size with the large necessary pre-tension when barrier is in the open position. To address this issue, in an example embodiment, the barrier can be lifted at an angle 80 to a full 90 degrees (perpendicular to the roadway) or an angle 80 almost perpendicular to the roadway, as for example shown in FIG. 11. When at this position, the second spring can be installed at its free, naturally extending, length. The first spring can be installed at an angle much closer to the road closed position when it is also in the almost fully extended position.

As will be understood by those skilled in the art, the size of springs selected and thus, the force generated by them will depend on the weight of the barrier that they will assist in opening and the torque generated by gravity on the barrier about its pivot axis. In this regard the springs can offset the torque due to gravity at each angle of the barrier relative to the frame.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" to another component, it can be directly attached to the other component or intervening components may be present therebetween.

What is claimed is:

1. A spring keeper for maintaining a high energy spring comprising:
   an outer barrel;
   an inner barrel slideable within the outer barrel;
      a first centerer fitted inside the inner barrel, said first centerer comprising a first base and a first projection projecting axially from the first base for being received within a first end portion of a spring;
      a second centerer fitted inside the outer barrel, said second centerer comprising a second base and a second projection projecting axially from the second base for being received within a second end portion of the spring;
      a layer of a wear resistant material covering at least a portion of the outer surface of the inner barrel that is received within the outer barrel; and
      another layer of wear resistant material covering an inner surface of the inner barrel, wherein said layer and another layer of wear resistant material extend beyond the inner barrel and are connected to each other at a location beyond the inner barrel.

2. The spring keeper of claim 1, further comprising a first shim for adjusting a preload of the spring, said first shim fitted in the inner barrel and sandwiched between the first centerer and the inner barrel.

3. The spring keeper of claim 2, further comprising a second shim for adjusting the preload of the spring, said second shim fitted in the outer barrel and sandwiched between the second centerer and the outer barrel.

4. The spring keeper of claim 1, further comprising a second shim for adjusting a preload of the spring, said second shim fitted in the outer barrel and sandwiched between the second centerer and the outer barrel.

5. The spring keeper of claim 1, wherein the wear resistant material comprises at least one of ultra-high molecular weight polyethylene (UMHW), Delrin and polytetrafluoroethylene (PTFE).

6. The spring keeper of claim 1, wherein each of said inner barrel and outer barrel is made from a material comprising at least one of steel, aluminum and titanium.

7. The spring keeper of claim 1, further comprising a clevis extending externally from one of the inner and outer barrels.

8. The spring keeper of claim 7, further comprising another clevis extending externally from the other of the inner and outer barrels.

9. A spring assembly comprising:
   a high energy spring; and
   a spring keeper, the spring keeper comprising,
      an outer barrel,
      an inner barrel slideable within the outer barrel,
      a first centerer fitted inside the inner barrel, said first centerer comprising a first base and a first projection projecting axially from the first base and received within a first end portion of the spring,
      a second centerer fitted inside the outer barrel, said second centerer comprising a second base and a second projection projecting axially from the second base and received within a second end portion of the spring,
      a layer of a wear resistant material covering at least a portion of the outer surface of the inner barrel that is received within the outer barrel, and
      another layer of wear resistant material covering an inner surface of the inner barrel, wherein said layer and another layer of wear resistant material extend beyond the inner barrel and are connected to each other at a location beyond the inner barrel.

10. The spring assembly of claim 9, further comprising a first shim for adjusting a preload of the spring, said first shim fitted in the inner barrel and sandwiched between the first centerer and the inner barrel.

11. The spring assembly of claim 10, further comprising a second shim for adjusting the preload of the spring, said second shim fitted in the outer barrel and sandwiched between the second centerer and the outer barrel.

12. The spring assembly of claim 9, further comprising a second shim for adjusting a preload of the spring, said second shim fitted in the outer barrel and sandwiched between the second centerer and the outer barrel.

13. The spring assembly of claim 9, wherein the wear resistant material comprises at least one of ultra-high molecular weight polyethylene (UMHW), Delrin and poly-tetrafluoroethylene (PTFE).

14. The spring assembly of claim 9, wherein each of said inner barrel and outer barrel is made from a material comprising at least one of steel, aluminum and titanium.

15. The spring assembly of claim 9, further comprising a clevis extending externally along a longitudinal axis of the spring from one of the inner and outer barrels.

16. The spring assembly of claim 15, further comprising another clevis extending externally along the longitudinal axis of the spring from the other of the inner and outer barrels.

\*  \*  \*  \*  \*